Sept. 17, 1929.   T. S. KEMBLE   1,728,892
SPRING SUPPORT FOR AUTO BUSSES, ETC
Original Filed July 2, 1924
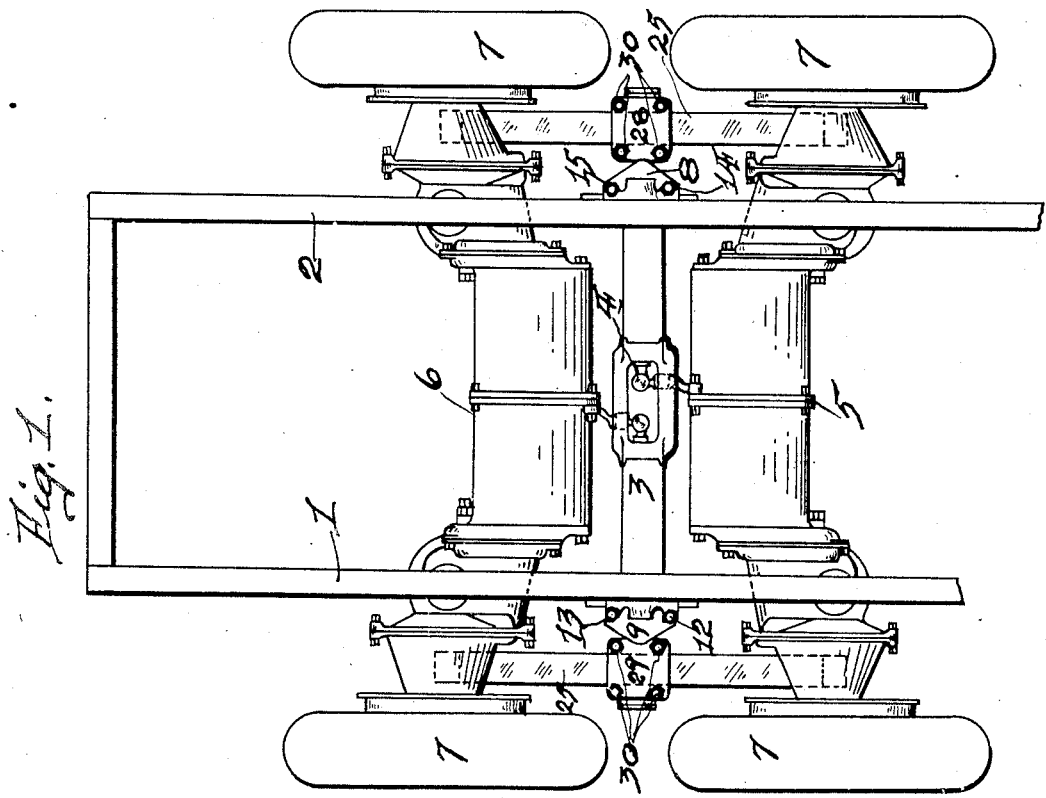
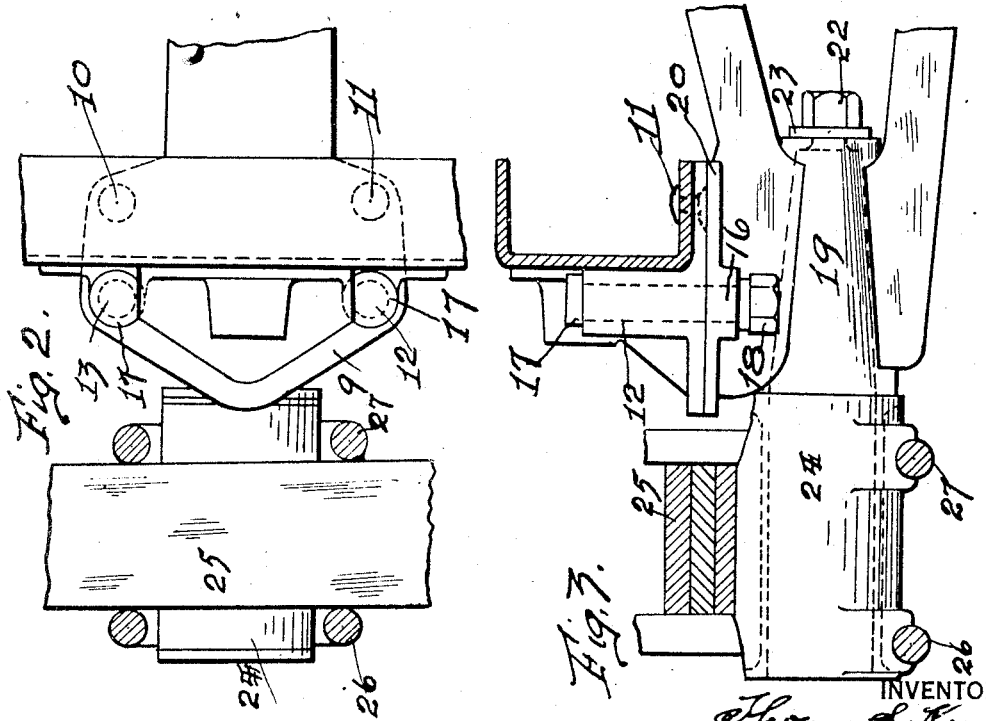
INVENTOR
Thomas S. Kemble
BY
Dodson and Roe
ATTORNEYS Patented Sept. 17, 1929

1,728,892

UNITED STATES PATENT OFFICE

THOMAS S. KEMBLE, OF LAKEWOOD, OHIO, ASSIGNOR TO UNIVERSAL GAS ELECTRIC COMPANY, OF LAWRENCE, KANSAS, A CORPORATION OF DELAWARE

SPRING SUPPORT FOR AUTO BUSSES, ETC.

Original application filed July 2, 1924, Serial No. 723,772. Divided and this application filed June 13, 1927. Serial No. 198,660.

My invention relates specifically to busses having a four-wheel electric drive, such as described in my copending application, Serial No. 723,772, of which this is a division; though it will appear to those skilled in the art, from the hereinafter contained description and the drawings herein referred to, that it is not directed exclusively to such type of drive, but may be found useful in connection with gear-driven axles where a differential and carrier are substituted for the electric motors, and suitable drive connections are provided for the differential.

My invention has for its object, to provide a construction in which the springs are mounted upon pivots secured to the cross member of the chassis.

A further object is to make the said cross member detachable, so that it is possible to quickly and easily remove the entire driving assembly for adjustment or repair, and to substitute another power plant, so that the bus does not need to be laid up or out of service while its driving power plant is being repaired or adjusted. This laying up of busses while such work is being done, is one of the serious expenses in their maintenance or cost of upkeep.

My means of accomplishing the foregoing objects may be more readily understood by having reference to the accompanying drawings, which are hereunto annexed and are a part of this specification, in which—

Fig. 1 is a plan view, showing a fragmentary portion of a bus chassis with the power plant, and equipped with my improved spring mounting; and Figs. 2 and 3 are enlarged detail views.

Similar reference numerals refer to similar parts throughout the entire description.

For the purpose of a full disclosure of my invention, I shall describe in detail a specific embodiment of my improvement, but it will be obvious that numerous changes might be made in the concrete embodiment thus disclosed, within the scope of the hereinafter contained claims. I therefore do not desire to be understood as limiting myself, in the broader aspect of my invention, to the specific details of construction, except as such limitations shall appear in the claims.

As shown in the drawings, the chassis is provided with two side frames 1 and 2 and a cross member 3, to which is secured by my torque system 4 two pairs of electric motors 5 and 6, which are connected to wheels 7 through suitable gear trains (not shown). Upon the side frames 1 and 2, and intermediate the motors 5 and 6, I mount brackets 8 and 9, which may be secured by rivets 10 and 11, or by welding or any other desirable method, to hold them firmly and securely in place. Each of the brackets 8 and 9 is provided with vertical bearings 12 and 13, and 14 and 15, respectively. The cross member 3 terminates at each end in a web 20, corresponding to the brackets 8 and 9, and is provided with bosses 16, which have central apertures which register with the vertical bearings 12, 13, 14 and 15. Threaded bolts 17 extend through the vertical bearings 12, 13, 14 and 15, and the bosses 16, and are provided with nuts 18 which serve to draw the cross member 3 and the brackets 8 and 9 tightly and firmly together. A horizontal bearing 19 is provided in each end of the cross member 3, below the web 20 and intermediate the vertical bearings 12 and 13, and 14 and 15, on the brackets 8 and 9. In these bearings 19 are mounted the spring pivots or trunnions, being held in position by a nut 22 and washer 23. The outer end 24 of the spring pivot or trunnion forms the support of the springs 25, which are held in place by U-bolts 26 and 27. Shackle plates 28 and 29 bear on the top of the springs 25 at their center, and are held by nuts 30 on the ends of the U-bolts 26 and 27. The ends of the springs 25 are suitably secured to the axles by spring bolts in the usual manner.

It will thus be seen that the springs 25 are rotatably mounted on the spring pivots 21 which are mounted in the cross member 3. Hence, it follows that in event that any of the motors, gears, or other parts of the power plant, require adjustment, cleaning, or repair, by removing the four bolts 17 the entire cross member 3 is freed from the chassis frame, and the whole assembly—axles, torque system or connections, wheels and springs—may be rolled from under the body of the vehicle, as a unit. A new, or repaired and adjusted, assembly may be rolled into its place, the four bolts 17 replaced, the nuts 18 tightened up, and the bus is again ready for use.

Having described my invention, what I regard as new, and desire to secure by United States Letters Patent, is:

1. In a vehicle, a chassis frame, a drive, comprising two axles arranged in tandem, springs connecting said axles, a removable cross-member, brackets secured to the side members of said chassis, there being vertical bearings in said brackets, webs on the ends of said cross-member having apertures therein which register with the vertical bearings in said brackets, bolts which fasten said webs to said brackets, a horizontal bearing formed in each end of said cross-member below the web, a spring support mounted in and extending outwardly from said bearing, U-bolts to secure said springs to said spring supports.

2. In a vehicle, a chassis frame, a drive, comprising two axles arranged in tandem, springs connecting said axles, a removable cross-member, brackets secured to the side members of said chassis, there being vertical bearings in said brackets, webs on the ends of said cross-member having apertures therein which register with the vertical bearings in said brackets, bolts which fasten said webs to said brackets, a horizontal bearing formed in each end of said cross-member below the web, a spring support detachably mounted in and extending outwardly from said bearing, U-bolts to secure said springs to said spring supports.

3. In a vehicle, a chassis frame, a drive, comprising two axles arranged in tandem, springs connecting said axles, a removable cross-member, brackets secured to the side members of said chassis, there being vertical bearings in said brackets, webs on the ends of said cross-member having apertures therein which register with the vertical bearings in said brackets, bolts which fasten said webs to said brackets, a horizontal bearing formed in each end of said cross-member below the web, a spring support mounted in and extending outwardly from said bearing, U-bolts to secure said springs to said spring supports, and links arranged to transmit axle torque reactions to said cross-member, said links being secured to said cross-member and said axles.

4. In a vehicle, a chassis frame, side members for said chassis frame, a removable cross member rigidly connecting said side members, a drive comprising two axles arranged in tandem, torque rods which connect said axles to said cross bar members, springs connecting said axles, spring supports secured to said springs, projections from the ends of said removable cross member, said spring supports being journalled on said projections, said cross member constituting the sole connection between said axles and said chassis frame.

THOMAS S. KEMBLE.